(12) United States Patent
Rozenboim

(10) Patent No.: US 11,683,119 B2
(45) Date of Patent: *Jun. 20, 2023

(54) FLOWLET SCHEDULER FOR MULTICORE NETWORK PROCESSORS

(71) Applicant: Marvell Asia Pte, Ltd., Singapore (SG)

(72) Inventor: Leonid Rozenboim, San Jose, CA (US)

(73) Assignee: Marvell Asia Pte, Ltd., Singapore (SG)

(*) Notice: Subject to any disclaimer, the term of this patent is extended or adjusted under 35 U.S.C. 154(b) by 186 days.

This patent is subject to a terminal disclaimer.

(21) Appl. No.: 17/091,647

(22) Filed: Nov. 6, 2020

(65) Prior Publication Data

US 2021/0058187 A1 Feb. 25, 2021

Related U.S. Application Data

(63) Continuation of application No. 15/608,852, filed on May 30, 2017, now Pat. No. 10,862,617.

(51) Int. Cl.
*H04L 1/00* (2006.01)
*H04L 47/62* (2022.01)
*H04L 47/56* (2022.01)
*H04L 45/00* (2022.01)
*H04L 47/625* (2022.01)
*H04L 47/125* (2022.01)
*H04L 45/745* (2022.01)

(52) U.S. Cl.
CPC ............ *H04L 1/0018* (2013.01); *H04L 45/38* (2013.01); *H04L 45/74591* (2022.05); *H04L 47/125* (2013.01); *H04L 47/562* (2013.01); *H04L 47/621* (2013.01); *H04L 47/6255* (2013.01)

(58) Field of Classification Search
CPC . H04L 1/0018; H04L 45/38; H04L 45/74591; H04L 47/125; H04L 47/562; H04L 47/621; H04L 47/6255
See application file for complete search history.

(56) References Cited

U.S. PATENT DOCUMENTS 7,796,627 B2 9/2010 Hurley et al.
8,705,366 B2 4/2014 Mekkattuparamban et al.
10,862,617 B2 * 12/2020 Rozenboim ........... H04L 47/562

(Continued)

OTHER PUBLICATIONS

Load Balancing without Packet Reordering in NV03 Draft-Chen-NV03-Load-Banlancing-00; H. ;Chen, et al.; Huawei Technologies; Oct. 27, 2014; pp. 1-11.

(Continued)

*Primary Examiner* — Walli Z Butt

(57) ABSTRACT

Systems and methods of using a packet order work (POW) scheduler to assign packets to a set of scheduler queues for supplying packets to parallel processing units. A processing unit and the associated scheduler queue is dedicated to a specific flow until a queue-reallocation event, which may correspond to the associated scheduler queue being idle for at least a certain interval as indicated by its age counter, or the queue being the least recently used, when a new flow arrives. In this case, the scheduler queue and the associated processing unit may be reallocated to the new flow and disassociated with the previous flow. As a result, dynamic packet workload balancing can be advantageously achieved across the multiple processing paths.

20 Claims, 5 Drawing Sheets

(56) References Cited

U.S. PATENT DOCUMENTS

| | | | |
|---|---|---|---|
| 2003/0133466 A1* | 7/2003 | Shimonishi | H04L 47/2408 |
| | | | 370/413 |
| 2006/0039393 A1* | 2/2006 | Firoiu | H04L 47/50 |
| | | | 370/412 |
| 2013/0188494 A1* | 7/2013 | Mekkattuparamban | |
| | | | H04L 49/90 |
| | | | 370/235.1 |
| 2013/0322501 A1* | 12/2013 | Takeuchi | H03M 13/6516 |
| | | | 375/219 |
| 2015/0049769 A1* | 2/2015 | Tamir | H04L 47/56 |
| | | | 370/412 |
| 2015/0146539 A1* | 5/2015 | Mehta | H04L 47/125 |
| | | | 370/237 |
| 2015/0146819 A1 | 5/2015 | Chowdhury et al. | |
| 2015/0341473 A1* | 11/2015 | Dumitrescu | H04L 45/7453 |
| | | | 370/392 |
| 2016/0149819 A1* | 5/2016 | Hussain | H04L 45/54 |
| | | | 370/236 |
| 2016/0283283 A1* | 9/2016 | Jung | H04L 67/1004 |
| 2016/0308769 A1* | 10/2016 | VerSteeg | H04L 43/0894 |
| 2018/0083866 A1* | 3/2018 | Gobriel | H04L 47/6215 |
| 2018/0167318 A1* | 6/2018 | Srinivasan | H04L 47/2441 |
| 2018/0212886 A1* | 7/2018 | Contavalli | H04L 47/22 |

OTHER PUBLICATIONS

Dynamic Load Balancing without Packet Reordering; Kandula, et al.; ACM SIGCOMM Computer communication Review; vol. 37, No. 2; Apr. 2007; pp. 53-62.

* cited by examiner

FLOWLET SCHEDULER FOR MULTICORE NETWORK PROCESSORS

REFERENCE TO RELATED U.S. APPLICATION

This application is a continuation of U.S. application Ser. No. 15/608,852 filed May 30, 2017, entitled "Flowlet Scheduler for Multicore Network Processors," by L. Rozenboim, now U.S. Pat. No. 10,862,617, the disclosure of which is incorporated herein by reference in its entirety.

TECHNICAL FIELD

Embodiments of the present invention are related to the field of communication networks, and in particular, to packet scheduling mechanisms in communication network systems.

BACKGROUND OF THE INVENTION

Computing and telecommunications systems are typically able to effectively process numerous different packet flows. It is commonplace that modern networking components use multiple parallel processing units (e.g., multiple processors or a multi-core processor) with support for multiple threads to exploit packet level parallelism inherent in network workloads. With such processing concurrency, packet ordering at the output of the network processor(s) cannot be guaranteed as the processing paths may differ in delay. Statistics show that 5% of packet flows experience at least one undesirable reorder event.

A prevalent approach is to let software application programs dictate what types of packets need to have the packet order preserved and focus resources to maintain packet order of the selected packets. For example, multicast applications are oblivious to packet order, while some Transmission Control Protocol (TCP)-based and User Datagram Protocol (UDP)-based applications are sensitive to packet order. Accordingly, the network components are configured with the capability of reordering all TCP and UDP packets by using complex circuit logic in combination with software function modules. However, as performance expectations for network systems increase over time, this approach becomes increasingly and even prohibitively cost-inefficient.

Another approach is to fix each packet flow to a specific processing unit, such that each processing unit is dedicated to processing a particular flow, and thereby avoid packet reordering caused by processing concurrency. Unfortunately, flows naturally differ widely in size and rate and, once assigned, each flow is pinned to the same processing unit permanently. Consequently, significantly unbalanced packet workloads may be distributed across the multiple processing units, resulting in reduced processing parallelism and inefficient usage of the multiple processing units. Further, absent a mechanism of quickly re-balancing processing load in the face of changing demands, the network component cannot react to traffic spikes, therefore leading to link congestion and decreased network throughput.

SUMMARY OF THE INVENTION

Accordingly, disclosed herein are mechanisms of effectively preventing packet reordering caused by processing concurrency with improved load-balancing across multiple processing units and yet without introducing complex circuitry or software logic in network equipment.

Embodiments of the present disclosure use a packet order work scheduler (POWS) scheduler to assign packets to a set of scheduler queues for supplying the packets to a plurality of parallel processing units. Each scheduler queue is dedicated to a respective processing unit and to a respective packet flow until an indication that packets of a flowlet (or a burst) in the flow have been supplied to the processing unit through the queue. In this case, the scheduler queue can be reallocated to another flow that is currently not associated with any scheduler queue in the set, thereby achieving load balancing with very low or no risk of introducing undesirable packet reordering caused by processing concurrency.

More specifically, a lookup table stores representations of a particular number of flow identifications (ID), where each flow ID is associated with a respective scheduler queue index and a respective age counter, implemented as a saturating counter with the maximum value equal to the number of flow identifications in the lookup table. For each packet, the POWS scheduler determines its flow ID and searches the lookup table for an entry that matches this flow ID. If a match entry is located, the packet is assigned to a scheduler queue according to the scheduler queue index stored in the sable lookup table entry associated with the ID; the associated age counter is reset (e.g., to 0) and then all age counters increment (e.g., by 1) except those having a saturation count (the maximum count). If no match entry is found, meaning the packet is from a new ("never seen" or "forgotten") packet flow that is not currently associated with any of the scheduler queue: a lookup table entry with the age counter equal to the maximum value (or the Least-Recently-Used, LRU) is selected to be replaced with the new ID, the shallowest scheduler queue is identified (i.e., the queue with the least number of pending packets) and its index is stored in the lookup table along with the new ID; and the associated age counter is reset. Finally, all the age counters increment except those having a saturation value (maximum count).

The scheduler queues may be implemented using ring buffers. The age counters may be implemented by using saturation arithmetic, which comprises a method of identifying LRU lookup table entry that has its age counter value equal to the saturation count. The index of an LRU lookup table entry may be saved as a candidate for subsequent eviction once its age count reaches the saturation value. The lookup table may be stored in a Content-Addressable Memory (CAM) with adjacent saturated age counter and scheduling queue index. A flow ID may be a computed as a hash function of a specific combination of source Internet Protocol (IP) address, destination IP address, Transmission Control Protocol (TCP) source and destination ports and the TCP protocol number, similar to prevalent practice.

According to the present disclosure, packets in a specific flow are exclusively assigned to a particular scheduler queue and processed by a dedicated CPU for certain duration of time. A scheduler queue may however contain packets from a number of different flows, interleaved. Therefore, packet ordering in this period of time can be advantageously ensured. In other words, the packet order in the flowlet is advantageously ensured. The queue-reallocation event may correspond to the flow being idle (and thus no packet of the flow being observed) for a certain interval as indicated by its age counter (e.g., the maximum count), or the flow ID being the LRU lookup table entry among the set, when a new flow comes. Such a queue-reallocation event is regarded as an indication that the processing unit has processed all the packets of the flow in the scheduler queue in such case, and the flowlet as well as the flow can then be "forgotten" by the lookup table without causing undesirable packet reordering of the flow. Thus, the flow's association with the scheduler queue and the processing unit are cleared such that the lookup table entry can be reallocated to a different flow having packets currently delivered. On the occurrence of a reallocation event, the new lookup table entry representing a new flow will be assigned to the least utilized scheduler queue, resulting in dynamic packet workload balancing that is advantageously achieved across the multiple processing paths. The dynamic load balancing advantageously allows a network component to react to traffic spikes, thereby reducing link congestions and increasing network throughput.

This summary contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying figures, in which like reference characters designate like elements.

DETAILED DESCRIPTION

Figure 1:
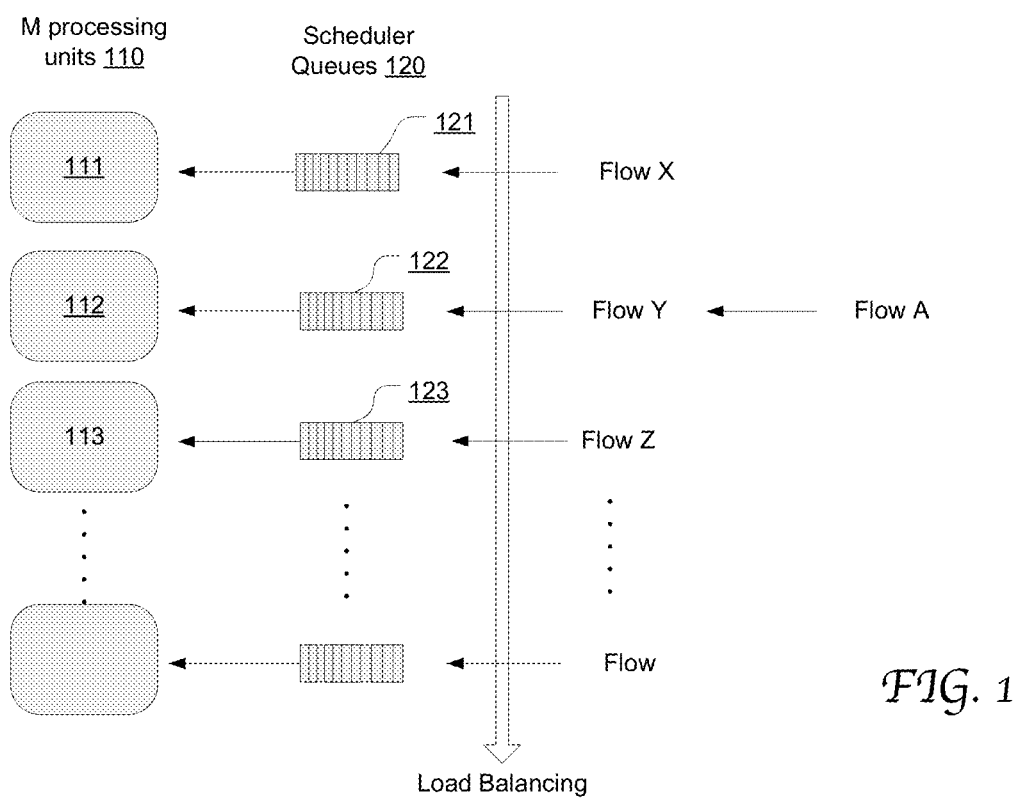
FIG. 1 illustrates exemplary allocation mechanisms of parallel processing paths including processing units with respect to packet flows and flowlets in network equipment in accordance with an embodiment of the present disclosure.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the figures is arbitrary for the most part. Generally, the invention can be operated in any orientation.

Notation and Nomenclature

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "searching" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or client devices. When a component appears in several embodiments, the use of the same reference numeral signifies that the component is the same component as illustrated in the original embodiment.

Flowlet Scheduler for Multicore Network Processors

It has been observed that packets in a flow usually are transmitted in bursts or flowlets that are spaced apart from each other in the time domain. If the time between two successive packets is larger than the maximum delay difference between the parallel processing paths, the second packet and the subsequent packets from this flow can be processed on any available path with no threat of reordering.

Overall, embodiments of the present disclosure use a scheduler, e.g., a packet order work scheduler (POWS), to assign packets to a set of scheduler queues for supplying packets to a plurality of processing units in network equipment. Packets in a specific flowlet of a flow are dedicated to a specific processing unit until a queue-reallocation event. Therefore, packet order of this flow can be advantageously preserved. The queue-reallocation event may correspond to the flow being idle for a certain interval as indicated by its age counter or the flow being the LRU flow among the set, when a new flow comes. Such a queue-reallocation event is regarded as an indication that all the packets of the flowlet have been processed by the processing unit, and the flow can then be "forgotten" by the scheduler queue with very low or no risk of causing undesirable packet reordering of the flow. Thus, the flow's association with the scheduler queue is cleared such that the flow is associated to a processing unit with the least number of pending packets in its scheduler queue when the flow becomes again active, and the lookup table entry can be allocated to a different flow. As a result, dynamic packet workload balancing can be advantageously achieved across the multiple processing paths.

The present disclosure can be applied in any type of network equipment, network nodes, or network devices with the capability of processing packets, such as gateways, routers, switches, general purpose computers, servers, client terminals, etc. A set of parallel "processing units" referred to herein may be any type of packet processing resources that are well known in the art, such as multiple cores in a processor, multiple processors, multiple processing engines or micro-engines, or combinations of processing modules, etc., and may include virtual processors. The processing units may have any function, composition, structure and may be used for any applications that are that well known in the art. For example, the processing units may be used for packet forwarding, packet switching, application data processing, etc.

FIG. 1 illustrates exemplary allocation mechanisms of parallel processing paths including processing units 110 with respect to packet flows and flowlets in network equipment in accordance with an embodiment of the present disclosure. As illustrated, at any time, a packet flow received at the network equipment is exclusively assigned to a particular scheduler queue 120 which exclusively provides packets to a particular processing unit. For example, packets in Flow X are assigned only to queue 121 and then processed by the processing unit 111, packets in Flow Y are assigned only to queue 122 and then processed by the processing unit 112, and packets in Flow Z are assigned only to queue 123 and then processed by processing unit 113. As each processing unit is dedicated to only one flow, the packet order of each flow can be advantageously preserved at the outputs of the processing units 110.

Further, if a scheduler queue has not received any packet from the flow for a sufficiently long interval, this idle interval can be used as an indication that the flowlet has been processed by the processing units, or has otherwise dropped, and thus the processing path including the processing unit and the scheduler queue can be reallocated to another flow that is not currently associated with any of the processing paths, e.g., a new or forgotten flow, as described in greater detail with reference to FIGS. 2-5.

Thus, according to embodiments of the present disclosure, the exclusive dedication of a processing path to a specific flow persists until a queue-reallocation event, where the processing path may include the scheduler queue and the processing units as well as any other components that are well known in the art. In some embodiments, a queue-reallocation event corresponds to a detection that the scheduler queue has been idle for a certain interval which may be measured by the count of packets arriving at the scheduler or at the set of scheduler queues, as described in greater detail below with reference to FIGS. 2-5.

As shown, the processing path, including scheduler queue 122 and processing unit 112, can be reallocated to New Flow A from Flow Y, provided that the last packet in Flow Y and the first packet in Flow A as seen by the scheduler queue 122 are spaced apart by at least a certain interval. Accordingly, the association between Flow Y and the processing path is terminated, and the processing path is dedicated to Flow A. If any new packet from Flow Y is received, another available processing path may be reallocated to Flow Y. Therefore, the packet traffic load is advantageously and dynamically distributed across the multiple processing paths, while packet ordering at the output of the processing paths is preserved. In this manner, the utilization efficiency of processing parallelism and aggregate performance can be advantageously enhanced regardless of the payload pattern. Further, in some embodiments, because a single lock-less scheduler queue is used to poll for each processing unit, polling overhead can be advantageously reduced, compared with the conventional method of using multiple receive queues for each port based on priority.

Figure 2:
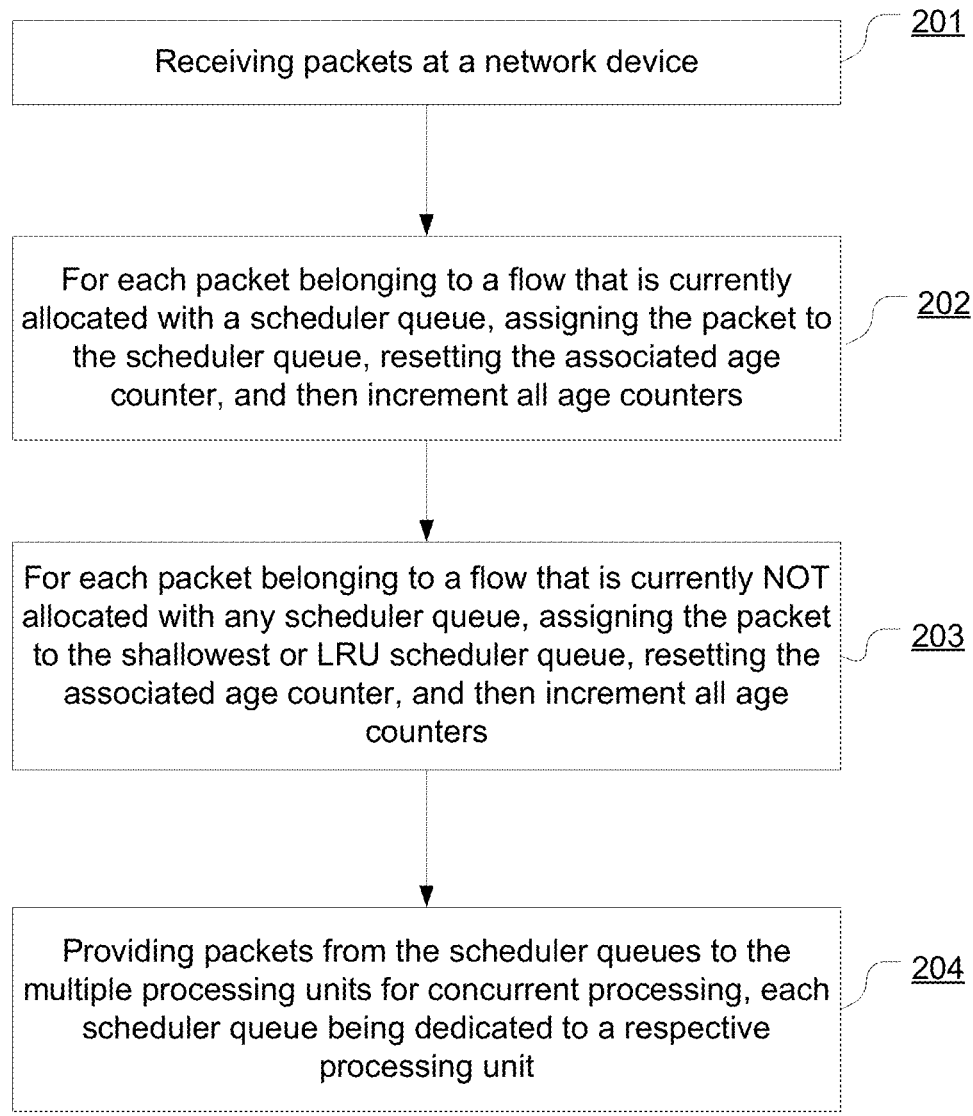
FIG. 2 is a flowchart depicting an exemplary process of distributing packet load across parallel processing paths in accordance with an embodiment of the present disclosure.

FIG. 2 is a flowchart depicting an exemplary process 200 of distributing a packet load across parallel processing paths in accordance with an embodiment of the present disclosure. Process 200 may be performed by network devices configured in FIG. 3 and FIG. 5 for example. Each processing path is associated with a timer or an age counter, or the like. In response to each event where a packet is assigned to a processing path (e.g., by a scheduler), the age counter of the processing path is reset (e.g., to 0), and then the age counters of the rest or all the processing paths increment (e.g., by 1). Each age counter is a saturation counter and stops incrementing once it reaches the saturation count. For instance, the saturation value may be set to 1024 counts.

More specifically, at 201, packets are received at a network device. The present disclosure is not limited to any specific characteristic of the packets to be processed. The packets can be of any type, format, protocol, length, content, and so on. Each packet is associated with a flow identification (ID). A plurality of flows can be identified and differentiated from each other by using any mechanism that is well known in the art. For example, a flow ID may be specific to a combination of source Internet Protocol (IP) address, destination IP address, Transmission Control Protocol (TCP) port and the TCP protocol.

At 202, for each incoming packet belonging to a flow that is currently associated with, or recently processed by, one of the processing paths, the packet is assigned to this processing path, as it is exclusively dedicated to the flow. In response to this packet assignment event, the age counter of this processing path is reset (e.g., to 0); whereas, the age counters of the rest of the processing paths, or all the processing paths, increment (e.g., by 1) in a saturated manner.

At 203, for each incoming packet belonging to a new flow (e.g., "never seen" or "forgotten" flow) that is not currently associated with any of the processing paths, a processing path is selected based on the depths of the scheduler queues or the age counters. In some embodiments, the shallowest scheduler queue and the associated processing path is selected and reallocated to this flow. In some other embodiments, the scheduler queue with the highest age count is selected and reallocated to this flow. In some other embodiments, once the age counter of a scheduler queue reaches the saturation count, the queue index is saved and preselected as a candidate for subsequent eviction or reallocation.

In response to this packet assignment event, the age counter of the selected processing path is reset (e.g., to 0); whereas, the age counters of the rest or all of the processing paths increment (e.g., by 1) in a saturated manner.

At 204, packets from the scheduler queues are supplied to the multiple processing units for concurrent processing, where each packet flow is exclusively assigned to a particular scheduler queue which exclusively provides packets to a particular processing unit.

Figure 3:
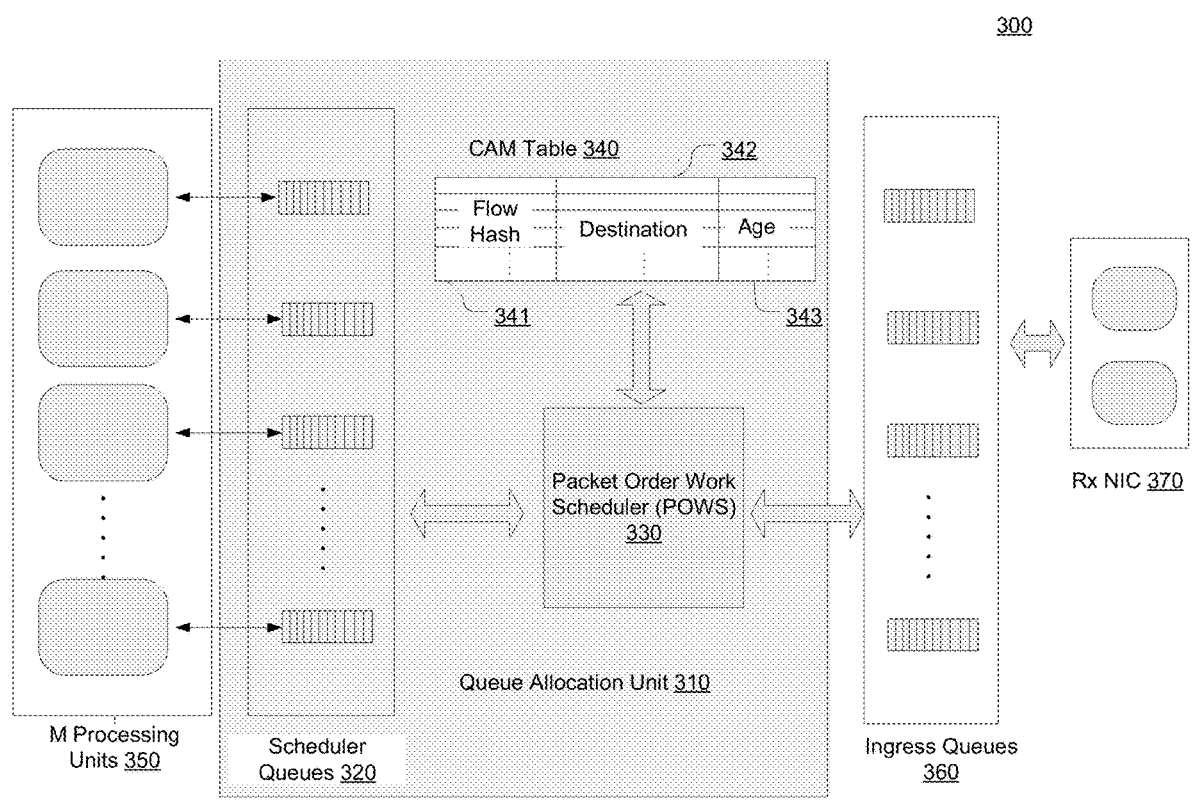
FIG. 3 illustrates the configuration of an exemplary queue allocation unit operable to dynamically allocate a set of scheduler queues for queuing packets and supplying the packets to parallel processing units in accordance with an embodiment of the present disclosure.

FIG. 3 illustrates the configuration of an exemplary queue allocation unit 310 operable to dynamically allocate a set of scheduler queues for queuing packets and supplying the packets to parallel processing units 350 in accordance with an embodiment of the present disclosure. In this example, packet flows are received at a receiver (RX) Network Interface Card (NIC) 370 and first assigned to the ingress queues 360.

The ingress queues 360 may queue received packets in any manner that is well known in the art. In some embodiments, the scheduling of the ingress queues 360 may be flow-based with each queue fixed to a particular flow.

However, this application is merely exemplary. It will be appreciated that in some other systems, ingress queues are omitted.

The queue allocation unit 310 is coupled to ingress queues 360 and may query for packets or packet descriptors in any suitable order that is well known in the art, such as based on priority, weighted round robin priority (WRRP), and so on. The queue allocation unit 310 includes a Packet Order Work Scheduler (POWS) 330, a Content-Addressable Memory 340 and scheduler queues 320. The CAM 340 stores a queue allocation table 341 with entries of flow ID representations. However, the queue allocation table 341 is a lookup table and can be stored in any other type of memory. Each flow ID is associated with an index of a scheduler queue 342 as the destination of the flow, and an age counter (or age count) 343 of the scheduler queue indicating the duration since the last packet was assigned to it. The scheduler queues may be implemented using ring buffers. The age counters may be implemented by using saturation arithmetic logic units.

The POWS 330 includes a search engine (not shown) configured to search the lookup table 341. During operation, the POWS 330 accesses a packet from the ingress queues 360 and determines its flow ID. For example, the POWS may determine a flow signature of the flow ID (e.g., last bits of the flow ID) and accordingly compute a search key, e.g., a hash key. The search engine in the POWS uses the key to search the flow ID lookup table 341 for a match entry. If a match flow ID entry is located, the packet is assigned to the corresponding scheduler queue as identified by the scheduler queue index associated with the match entry. For example, the packet descriptor is posted to the scheduler queue. Its associated age counter is reset (set to 0), and all age counters increment by 1 except those reaching a saturation count (the maximum count).

If no match flow ID entry is found in the table 341, meaning the packet is from a new ("never seen" or "forgotten") flow that is not currently associated with any of the scheduler queue, the shallowest scheduler queue is identified by comparing the queued depths of queues 320. Alternatively, the Least-Recently-Used (LRU) scheduler queue is identified based on the age counters and reallocated to the new flow. In many cases, the LRU scheduler queue is the one with the highest age count. In some embodiments, each time a scheduler queue reaches a saturation count, its index is saved as a candidate for eviction and reallocation to be used later. The packet descriptor is posted to the selected scheduler queue. Accordingly, the age counter of the identified scheduler queue is reset, the existent flow ID entry is replaced with the new flow ID, and the rest of or all the age counters increment except those reaching a saturation count. As a result, the scheduler queue is reallocated to the new flow and its association with the previous flow is cleared or "forgotten."

Regardless of the reallocation, a particular scheduler queue is still associated with only one packet flow at one time, and exclusively provides packets to a particular processing unit. This ensures preservation of packet order at the output of the processing units.

The various components in the queue allocation unit can be implemented in any suitable manner that is well known in the art and may use hardware logic, software logic, or a combination therefore. It will be appreciated that the scheduler queues may be configured to store the packets, or only store pointers to the packets while the packets are stored elsewhere. The lookup table may be implemented as a hash table or any other kind of lookup table that is well known in the art.

A queue allocation unit according to the present disclosure can be implemented as an add-on or plug-in component to a legacy network device or system. It can also be implemented as a function module integrated in a network device, e.g., a NIC. In some embodiments, the ingress and scheduler queues are both on the same integrated circuit or the same chip, e.g., share an L1 cache. In some other embodiments, the POWS is a separate Peripheral Component Interconnect Express (PCI-e) device and can access the ingress queues via a system bus, L3 cache or memory, etc.

Figure 4:
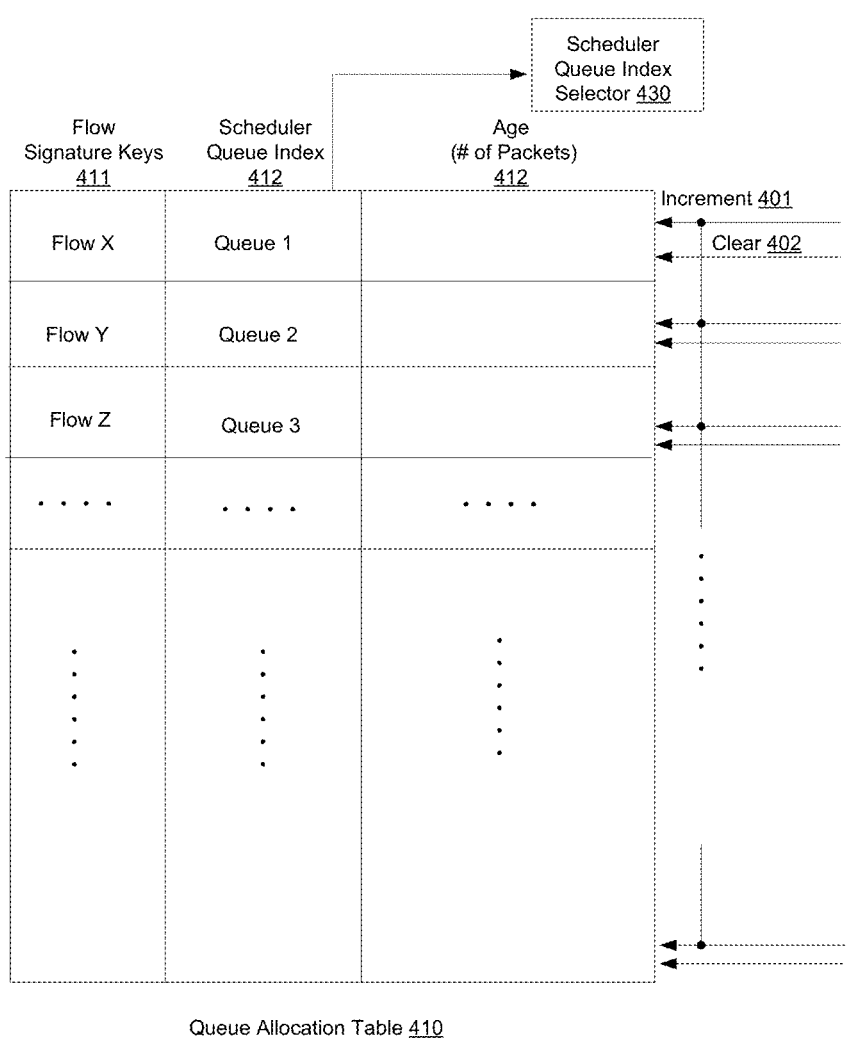
FIG. 4 illustrates the configuration of an exemplary queue allocation table in accordance with an embodiment of the present disclosure.

FIG. 4 illustrates the configuration of an exemplary queue allocation table 410 in accordance with an embodiment of the present disclosure. The queue allocation table 410 may be stored in a CAM and includes a field 411 of flow ID keys including a fixed number of keys representing flow IDs (e.g., flow signatures), a field 412 of the scheduler queue index and a field of age 413. Each flow ID key is associated with a respective scheduler queue index and a respective age counter.

In some embodiments, the number of entries in each field in the CAM table may be selected based on the number of flows (or flowlets) observed at any given time. The CAM table only needs to be large enough to allow a sufficient number of in-flight packets without any reordering. For instance, a 1024-entry in the table will likely allow up to 1000 in-flight packets without any reordering assuming 32 cores each can process up to 32 packets in every batch.

Each age counter may be a saturation counter, e.g., including a saturation arithmetic logic unit (ALU), and controls the value in a respective "Age" entry in the table 410. For each incoming packet, a search engine in the POWS (e.g., 330 in FIG. 3) determines its flow ID and searches the flow ID field 411 for an entry that matches this flow ID, for example by using a hash function. If the search yields a match, the packet is assigned to the associated scheduler queue index in the field 412. Accordingly, the associated age counter outputs a "Clear" signal 402 to reset the age count to 0. All age counters then output an "Increment" signal 401 to add 1 count to all the age entries except those that have saturated. In the illustrated example, the "Increment" output 401 of all the age counters 412 are connected and thus all age counters increment at the same time; however, this is merely exemplary and the present disclosure is not limited thereto.

On the other hand, if the search yields no match flow ID, the scheduler queue index selector 430 selects (1) a shallowest scheduler queue, (2) the LRU scheduler queue which corresponds to one with the highest age count, or (3) a preselected scheduler queue with a saturated age count, or the like. The scheduler queue index selector 430 then outputs the index of the selected scheduler queue. In response, the flow ID entry associated with the selected scheduler queue index is updated with the new flow ID. Any subsequent incoming packets of this new flow will be assigned to this selected scheduler queue index. In this manner, the selected scheduler queue is reallocated to the new flow and its association with the previous flow is terminated. The associated age counter outputs a "Clear" signal to reset the age entry to 0. All age counters then output an "Increment" signal to add 1 count to all the age entries except those that have saturated.

Figure 5:
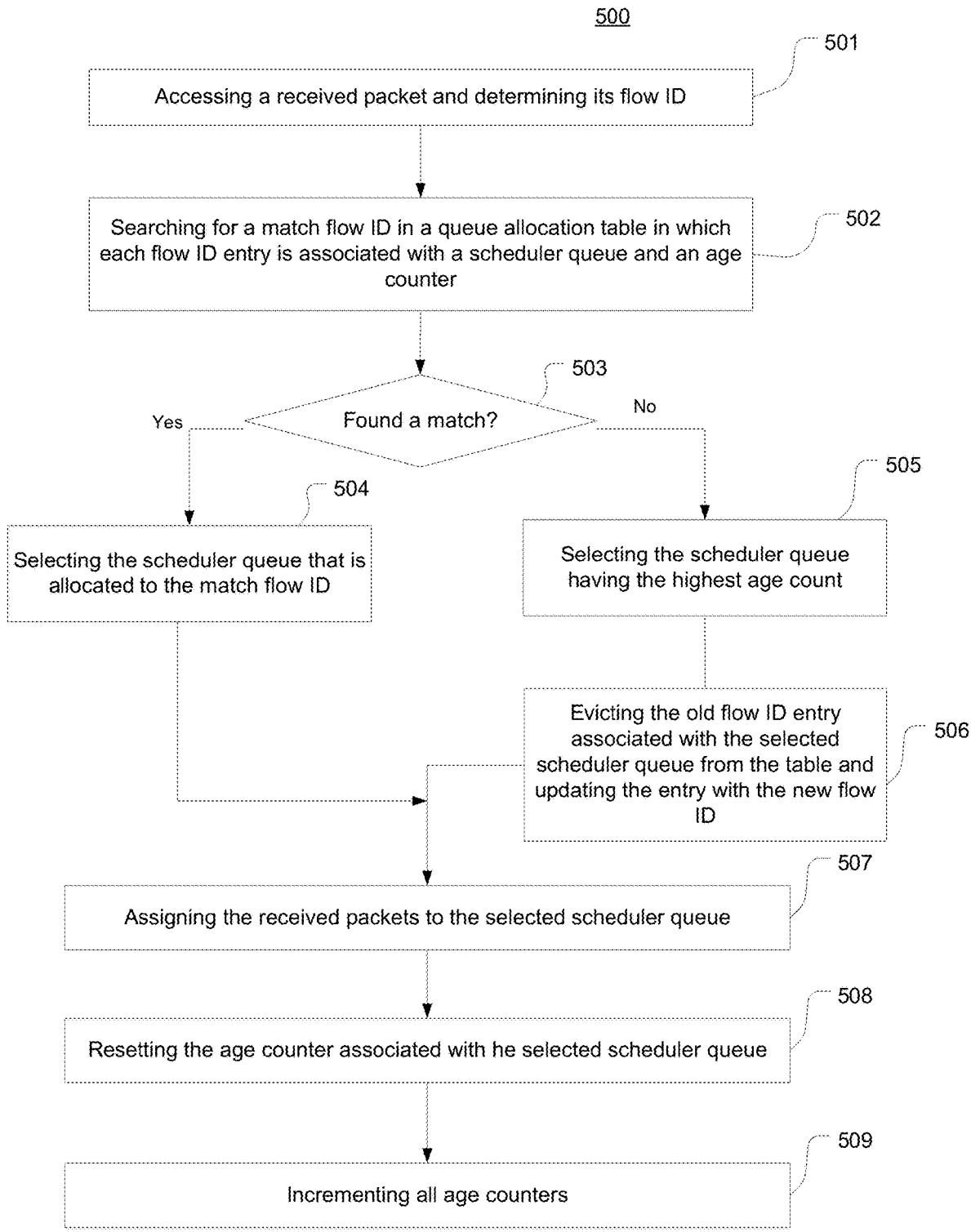
FIG. 5 is a flowchart illustrating an exemplary process of selecting a scheduler queue for a packet and updating the age counters in accordance with an embodiment of the present disclosure.

FIG. 5 is a flowchart illustrating an exemplary process 500 of selecting a scheduler queue for a packet and updating the age counters in accordance with an embodiment of the present disclosure. Process 500 may be performed by the queue allocation unit as shown in FIGS. 3 and 4. However, it will be appreciated the present disclosure is not limited to these implementations.

At 510, a received packet is accessed from the ingress queue or receive (RX) queue at a network interface. At 502, the queue allocation table is searched for a flow ID entry that matches the flow ID of the received packet. According to the queue allocation table, each flow ID entry is associated with a scheduler queue and an age counter. At 503, it is determined if a match entry has been located.

If yes, the scheduler queue associated with the match entry is selected at 504. If no match entry is located, the scheduler queue with the highest age count or a saturation count is selected at 505. The existent flow ID entry associated with this selected scheduler queue is evicted and replaced with the new flow ID entry at 506.

In either case, the received packet is assigned to the selected scheduler queue at 507. At 508, the associated age counter is reset to 0, and at 509, all age counters increment by 1 in a saturated manner. In some embodiments, on every packet processed, the scheduler queue with the highest age count is stored as candidate for eviction as to be used in 505. The foregoing process 501-509 is repeated for each packet assignment.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law. Any claimed embodiment of the invention does not necessarily include all of the objects or embodiments of the disclosure.

What is claimed is:

1. A method performed by a network device, comprising:
   assigning packets of a plurality of packet flows to a set of scheduler queues, wherein a respective packet flow of said plurality of packet flows is associated with a respective scheduler queue of said set of scheduler queues, and wherein said assigning comprises assigning packets from different packet flows of said plurality of packet flows to a same scheduler queue of said set of scheduler queues responsive to an indication that said different packet flows are spaced apart from each other by at least a prescribed interval;
   reallocating a scheduler queue of said set of scheduler queues to a different packet flow of said plurality of packet flows in response to occurrence of a reallocation event for said scheduler queue; and
   providing packets from said set of scheduler queues to a plurality of processing units for processing, wherein each scheduler queue of said set of scheduler queues is configured to provide said packets from said set of scheduler queues to a respective processing unit of said plurality of processing units.

2. The method of claim 1, wherein said reallocation event comprises a determination that a packet flow assigned to said scheduler queue is idle for a prescribed interval of time.

3. The method of claim 1, wherein said reallocation event comprises a determination that a count of a number of packets of a packet flow assigned to said scheduler queue is below a threshold amount.

4. The method of claim 1, wherein said reallocation event comprises a determination that an identifier for a packet flow assigned to said scheduler queue is the least recently used entry in a table comprising identifiers for said packet flows.

5. The method of claim 1, wherein said assigning further comprises, for each packet of said different packet flows:
   determining if said each packet belongs to any packet flow currently associated with said set of scheduler queues based on identifiers for said different packet flows; and
   responsive to a determination that a packet belongs to a packet flow currently associated with a scheduler queue of said set of scheduler queues, assigning said packet to said scheduler queue associated with said packet flow.

6. The method of claim 1, wherein said reallocating comprises replacing, in a lookup table that stores entries comprising identifiers for said plurality of packet flows currently associated with said set of scheduler queues, an entry for a prior packet flow associated with said scheduler queue with an entry comprising an identifier for said different packet flow.

7. The method of claim 1, wherein said reallocating comprises assigning said different packet flow to a scheduler queue that is selected based on depths of said set of scheduler queues.

8. A network device, comprising:
   a network interface configured to receive a plurality of packet flows;
   a memory coupled to said network interface and operable to store a table comprising entries comprising identifiers for said plurality of packet flows;
   a scheduler coupled to said memory;
   a set of scheduler queues coupled to said scheduler, wherein each entry of said entries in said table is associated with a respective scheduler queue of said set of scheduler queues;
   wherein said scheduler is configured to:
      assign packets from different packet flows of said plurality of packet flows to a same scheduler queue responsive to an indication that said different packet flows are spaced apart from each other by at least a prescribed interval;
      select a scheduler queue from said set of scheduler queues using said table;
      assign a packet to said selected scheduler queue;
      reallocate said scheduler queue to a different packet flow of said plurality of packet flows in response to occurrence of a reallocation event for said scheduler queue; and
   a plurality of processing units coupled to said set of scheduler queues, wherein each scheduler queue of said set of scheduler queues is configured to provide said packets to a respective processing unit of said plurality of processing units.

9. The network device of claim 8, wherein said scheduler is further configured to:
   search said table to determine if said packet belongs to a packet flow currently associated with said set of scheduler queues; and
   if said packet does not belong to a packet flow currently associated with said set of scheduler queues, then assign said packet to a Least-Recently-Used (LRU) scheduler queue.

10. The network device of claim 8, wherein said table comprises a hash table, and wherein said scheduler is further configured to:
    compute a hash key based on an identifier for a packet flow of said plurality of packet flows that includes said packet;

use said hash key to search said table for a match entry matching said identifier for said packet flow that includes said packet; and responsive to locating said match entry in said table, assign said packet to a scheduler queue associated with said match entry.

11. The network device of claim 8, wherein said reallocation event comprises a determination that a packet flow assigned to said scheduler queue is idle for a prescribed interval of time.

12. The network device of claim 8, wherein said reallocation event comprises a determination that a count of a number of packets of a packet flow assigned to said scheduler queue is below a threshold amount.

13. The network device of claim 8, wherein said reallocation event comprises a determination that a flow identifier for a packet flow assigned to said scheduler queue is the least recently used entry in said table.

14. The network device of claim 8, wherein reallocating said scheduler queue comprises replacing, in said table, an entry for a prior packet flow associated with said scheduler queue with an entry comprising an identifier for said different packet flow.

15. The network device of claim 8, wherein reallocating said scheduler queue comprises assigning said different packet flow to a scheduler queue that is selected based on depths of said set of scheduler queues.

16. A system, comprising:
a plurality of processing units configured to process a plurality of packet flows received from a communication network;
a set of scheduler queues coupled to said plurality of processing units and configured to provide packets to said plurality of processing units, wherein each scheduler queue of said set of scheduler queues is allocated to a respective processing unit of said plurality of processing units; and
a packet scheduler coupled to said set of scheduler queues and configured to allocate said packets to said set of scheduler queues, wherein a respective packet flow of said plurality of packet flows is assigned to a respective scheduler queue of said set of scheduler queues, and wherein said packet scheduler is configured to assign packets from different packet flows of said plurality of packet flows to a same scheduler queue of said set of scheduler queues responsive to an indication that said different packet flows are spaced apart from each other by at least a prescribed interval.

17. The system of claim 16, further comprising memory operable to store a table comprising identifiers for a number of said packet flows, wherein said table comprises a hash table, and wherein said packet scheduler is further configured to:

compute a hash key based on an identifier for a packet flow of said plurality of packet flows that includes said packet;

use said hash key to search said table for a match entry matching said identifier for said packet flow that includes said packet;

responsive to locating said match entry in said table, assign said packet to a scheduler queue associated with said match entry; and responsive to a failure to locate said match entry in said table, assign said packet to a Least-Recently-Used (LRU) scheduler queue.

18. The system of claim 16, wherein said packet scheduler is further configured to reallocate a scheduler queue of said set of scheduler queues to a different packet flow in response to a determination that a packet flow assigned to said scheduler queue is idle for a prescribed interval of time.

19. The system of claim 16, wherein said packet scheduler is further configured to reallocate a scheduler queue of said set of scheduler queues to a different packet flow in response to a determination that a count of a number of packets of a packet flow assigned to said scheduler queue is below a threshold amount.

20. The system of claim 16, wherein said packet scheduler is further configured to reallocate a scheduler queue of said set of scheduler queues to a different packet flow in response to a determination that an identifier for a packet flow assigned to said scheduler queue is the least recently used entry in a table comprising identifiers for said packet flows.

\* \* \* \* \*